United States Patent [19]

Shogren

[11] Patent Number: 4,673,285

[45] Date of Patent: Jun. 16, 1987

[54] OPTICAL SCANNING OF DUPLEX DOCUMENTS

[75] Inventor: David K. Shogren, Ontario, N.Y.

[73] Assignee: Xerox Corporation, Stamford, Conn.

[21] Appl. No.: 867,359

[22] Filed: May 23, 1986

[51] Int. Cl.$^4$ .................. G03B 27/32; G03B 27/52
[52] U.S. Cl. .................................... 355/23; 355/51
[58] Field of Search .................. 355/23, 24, 51, 60, 355/66

[56] References Cited

U.S. PATENT DOCUMENTS

| | | | |
|---|---|---|---|
| 2,578,320 | 12/1951 | Schubert | 355/23 |
| 3,318,212 | 5/1967 | Rubin | 355/24 X |
| 3,885,871 | 5/1975 | Galatha et al. | 355/23 |
| 3,998,543 | 12/1976 | Wick et al. | 355/24 |
| 4,035,073 | 7/1977 | DelVecchio | 355/24 |
| 4,536,077 | 8/1985 | Stoffel | 355/24 X |

FOREIGN PATENT DOCUMENTS 205141 11/1983 Japan ........................... 355/23

Primary Examiner—Richard A. Wintercorn

[57] ABSTRACT

A scanning system is provided for sequentially scanning both sides of a duplex document and projecting images onto a light sensitive linear array. In a first configuration, the platen and scan/illumination stations are fixed and the document is moved across the platen in a scan and reverse scan direction. The scan/illumination stations are sequentially energized and images of both sides of the document are directed along separate optical paths until they are redirected by a movable mirror assembly into a common lens. In a second configuration, both sides of a duplex document are sequentially scanned by movable scan/illumination stations and directed into a common lens which sequentially projects the document images onto the linear array.

10 Claims, 8 Drawing Figures

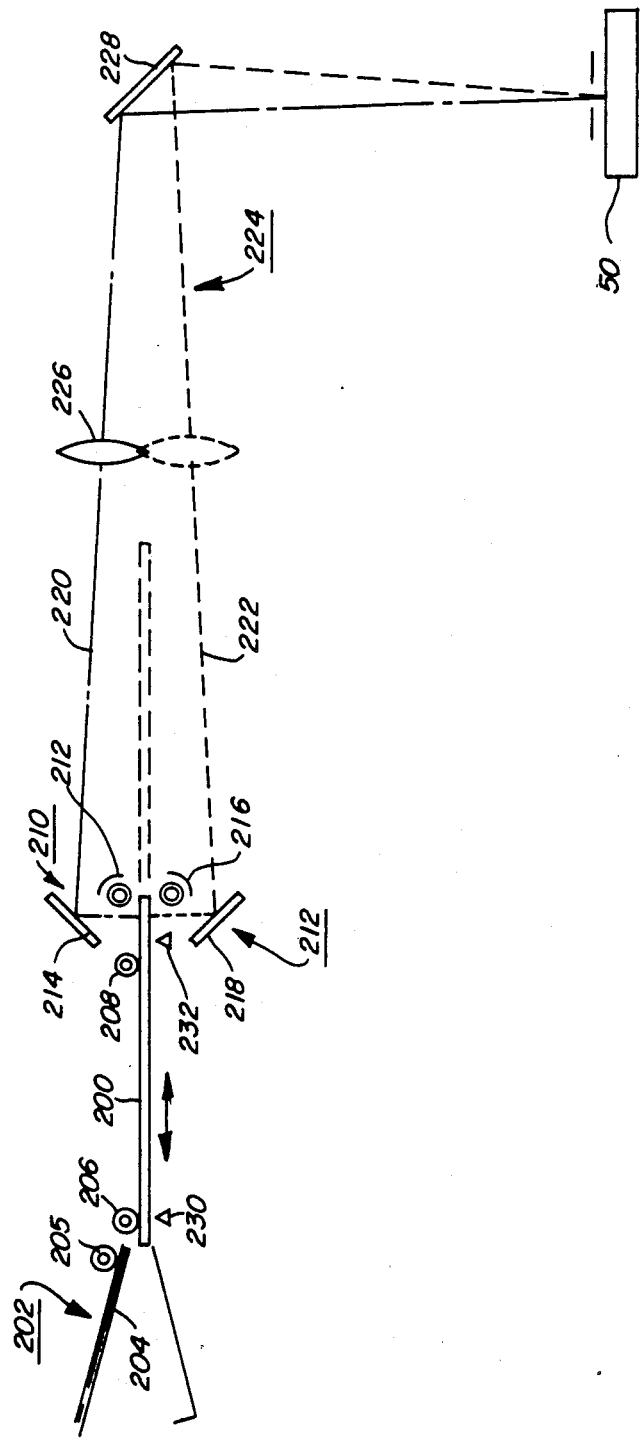

OPTICAL SCANNING OF DUPLEX DOCUMENTS

The present invention relates generally to an electrophotographic reproduction system and, more particularly, to an improved optical scanning system which includes single pass copying of duplex documents.

During document reproduction runs, it is often required that documents having information on both sides of the document be reproduced. Such a document is commonly referred to as a duplex document to distinguish over single side information (simplex) documents. One prior art technique employed to copy duplex documents is to sequentially expose both sides of the duplex sheet, forming separate latent images of each side on a photosensitive surface. Depending on the output sheet configuration, each side of a document may be reproduced on a separate output sheet or on both sides of an output sheet. This technique requires that the operator first place one side of the duplex document on a platen, wait until the exposure is completed and then turn the document over to expose the second side of the document. Throughput productivity is adversely affected because of the time required to turn over the document. Productivity is also adversely affected when multiple duplex documents are to be reproduced since each document must be handled in the same way.

Various prior art techniques are known which expose both sides of a duplex document without requiring that the document be manually turned over. U.S. Pat. No. 4,035,073 describes a duplex document reproduction machine in which a duplex document is inserted between two transparent surfaces of a document platen. The platen is moved past a pair of fixed scan/illumination assemblies positioned on opposite sides of the platen. The scan/illumination assemblies are sequentially engaged in conjuntion with the platen movement to form separate latent images, via a single projection lens, of each side of the document on the surface of a photoreceptor drum.

U.S. Pat. No. 3,318,212 discloses another duplex reproduction system in which, as shown in FIG. 4, a duplex document is placed on a fixed platen. Each side of the document is simultaneously scanned by a movable lamp/lens system to form separate images on the surfaces of a photoreceptor drum.

U.S. Pat. No. 2,578,320 discloses a photographic copying apparatus in which both sides of a document are successively photographed by two mirror/lens assemblies.

Xerox Disclosure Journal Vol. 8, No. 3, May/June 1983, p. 263 discloses a system wherein duplex documents are fed onto the surface of a fixed platen by an automatic recirculating document handler (RDH) in conjunction with a pair of constant velocity document transports. One side of the document is scanned by a fixed scan/illumination assembly and an image formed at a linear array. The opposite side is simultaneously scanned by a combination illumination/receptor array.

U.S. Pat. No. 4,536,077 discloses a multiple mode raster scanner system. In the MODE II operation, a duplex document is circulated by an RDH past two separate scan/illumination stations 52, 54. Station 54 is fixed and sequentially scans one surface of the document as it moves through the scan zone. The image is reflected by a pivotable mirror into the projection lens and then focused onto the surface of a linear display 30. The document is moved so that the opposite side of the document passes the second scan station 54 which, in this mode, is also fixed. An incremental image of the second side is projected by the lens onto the linear array.

These prior art devices require relatively expensive components which add to the complexity of the system. Throughput is adversely affected because of the necessity of returning scan components to a start of scan position and the optical systems employed are often not sufficiently precise to meet the stricter imaging tolerances required when forming images at a light sensitive linear array. The present invention, therefore is directed towards a duplex reproduction system in which both sides of the document are sequentially scanned, with no loss in throughput, by a relatively simple optical system which, nonetheless, forms precisely positioned image lines on the surface of a photoreceptor of linear image array (RIS) device.

More particularly, the invention relates to apparatus for sequentially scanning both sides of a duplex document and for projecting line images along an optical path onto a light sensitive image member comprising, in combination:

a stationary transparent platen located in an object plane, a first and second scan/illumination station positioned on opposite sides of said platen, means for moving a duplex document across said platen in a first direction to provide a scan excursion adjacent the first side of the document and in a reverse scan direction to provide a scan excursion adjacent the second side of the document, means for energizing said first scan/illumination station at the start of said first scan excursion whereby reflected first side images are propagated along a first optical path, means for energizing said second scan/illumination station at the start of said reverse scan excursion whereby reflected second side images are propagated along a second optical path, a stationary projection lens for projecting and focusing document images on the surface of said light sensitive member, and optical means positioned between the platen and said lens, said optical means adapted to sequentially direct said first and second side images along a common optical path into said lens, whereby said lens projects said images along a common optical path to said light sensitive member.

Figure 1:
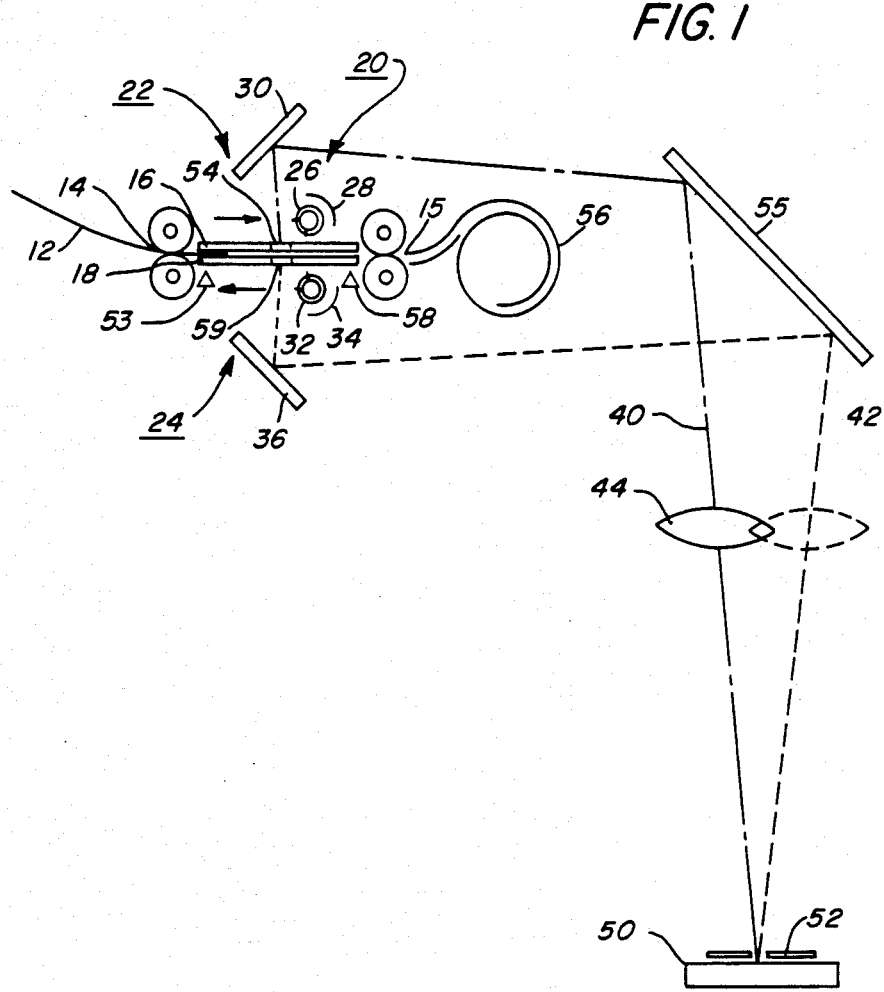
FIG. 1 shows a first embodiment of an optical system for scanning both sides of a moving document and for projecting the document information onto a photosensitive surface.

As shown in FIG. 1, an original document 12 is fed by two pairs of pinch rollers 14, 15 at a constant velocity, between two transparent glass plates 16, 18 forming a document platen 20. Arranged on each side of platen 20 is a pair of fixed scan/illumination stations 22, 24. Station 22 includes an elongated, apertured illumination lamp 26, associated reflector 28 and folding mirror 30. These components have a length which extends across the platen length sufficient to illuminate the entire surface of a document moving past the station. Station 24 includes apertured illumination lamp 32, associated reflector 34 and folding mirror 36. Depending upon whether MODE I or MODE II operation is selected, illumination station 22 alone, or stations 22, 24, in sequence, are energized. Image rays from the side of the document being illuminated will be reflected along optical path 40 or 42. Lens 44 focuses a line-like scanned image onto the surface of linear array 50 through a scan aperture 52. Lens 44 is selectively movable from one optical path to the other, depending on the side of the document being scanned. Array 50 may comprise any suitable, commercially available light sensitive array. While a single array 50 is illustrated, it will be understood that plural arrays which may be either optically or electronically abutted or overlapped may be used. It will also be understood that the image can be focused onto the surface of a photosensitive belt or drum, forming images thereon which can subsequently be developed, as is known in the art.

When it is desired to operate in the first, simplex mode (MODE I), the document or documents to be scanned are fed between rollers 14. A first sensor 53 detects the leading edge of the document and generates an output signal, energizing lamp 26. (Lamp 32 is inoperative in this mode.) The document is moved at a constant velocity past an illuminated scan strip 54 which extends across the width of the platen. The images from the top of the document are reflected by mirror 30 and folding mirror 55 along optical path 40 to lens 44 and thence to array 50. When the entire document has moved past strip 54, an electronic image has been captured and outputted by array 50 to an output terminal which may be, for example, a remote printer. The document, at the end of scan has been scrolled into chamber 56. Sensor 58 detects the trailing edge of the document and generates a signal to reverse the rotational direction of roller pair 14, 15. Document 12 is then moved out of platen 20 and may be directed to an output tray (not shown).

For operation in the duplex mode, the scanning operation proceeds as for the simplex mode up to the end of scan with the document scrolled into chamber 56. Sensor 58, in addition to generating a roller reverse rotation signal, also generates a signal used to remove power from lamp 26 and to energize lamp 32. These signals are sent to a system controller which performs the required functions as described below. An additional signal is generated by the system controller causing lens 44 to move to the dotted line position along optical path 42. The bottom side of the document is then scanned as the document is unscrolled. As the document moves past the scan slit 59, the reflected image travels along scan path 42 to array 52. This configuration results in the correct image orientation for head to head duplex when documents are long edge fed and are in the portrait mode.

Figure 2:
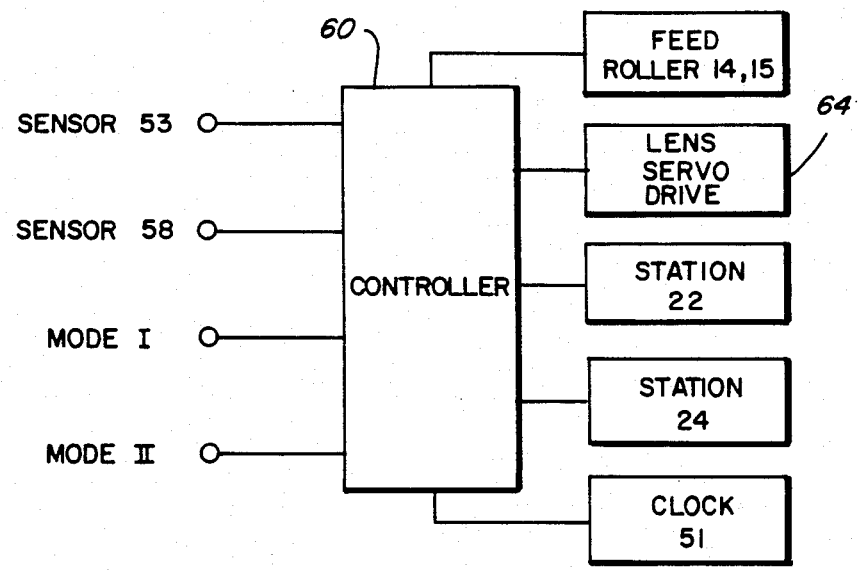
FIG. 2 is a block diagram of the control circuit for the FIG. 1 embodiment.

Referring to FIG. 2, a suitable controller 60 is provided to enable an operator to select the operating mode desired and to control the various functions. The controller accepts inputs designating the particular mode selected and signals generated by sensors 53, 58. Controller 60 outputs are then used to control the feed roller rotation and illumination sequencing. A signal is sent to lens servo drive 64, in MODE II operation, to change the position of lens 50. The controller also generates the signal to clock 51 which enables array 50 operation. A suitable controller is an Intel Model 8085 which is programmed to perform the described functions as is known to those skilled in the art.

It is appreciated that the FIG. 1 embodiment may be modified, if desired, to utilize a second lens in optical path 42, thereby avoiding the necessity for moving lens 44 between optical paths.

Figure 3:
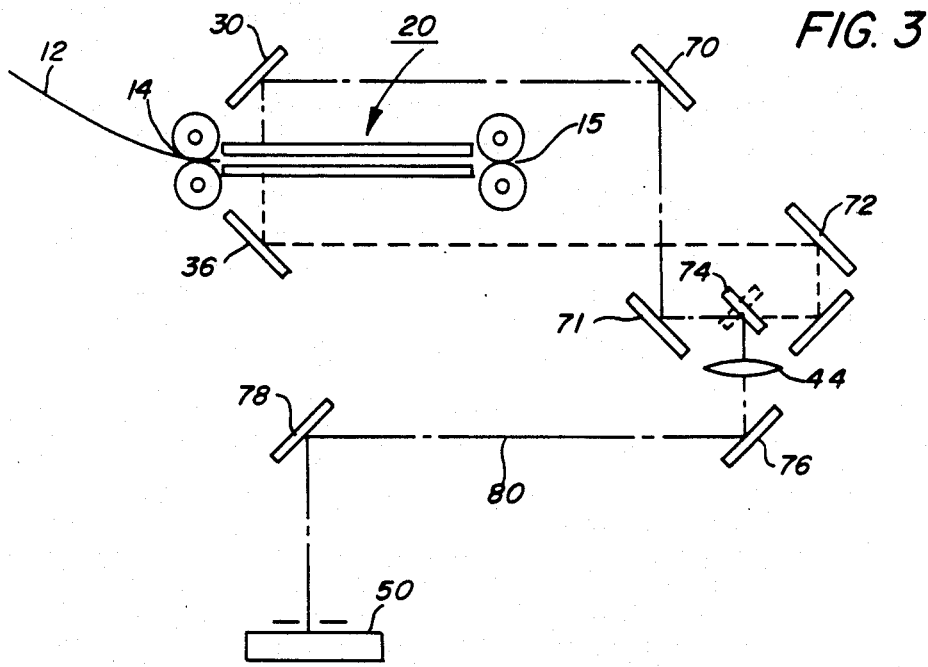
FIG. 3 is a second embodiment of the scan system of FIG. 1.

Referring now to FIG. 3, there is shown second embodiment of the present invention which utilizes the scanning and feed components of the FIG. 1 embodiment but which adds folding mirrors 70, 71, mirror pair 72, pivoting mirror 74 and folding mirrors 76, 78. This arrangement enables a single lens system. In operation, the document is fed into the platen and the top side is scanned as described above. (The illumination stations and sensors have been omitted for descriptive purposes. The reflected image from mirror 30 is further reflected by mirrors 70 and 71 and from pivotable mirror 74, in the solid line position, into lens 44. The projected image is then folded by mirrors 76, 78 and focused onto array 50. In the duplex mode, the controller 60 is adapted to send a signal to mirror 74, causing the mirror, by means of a motor (not shown) to pivot to the dotted line position. The scan of the bottom of the document then proceeds as described for the FIG. 1 embodiment with the reflected images from mirror 36 being further reflected by mirror pair 72 and pivotable mirror 74 into lens 44. The image is then projected along optical path 80 as described above. This system also results in head to head duplex in the portrait mode. The FIG. 3 embodiment can be modified by replacing the pivotable mirror 74 by a rotating rhomb prism.

Figure 4:
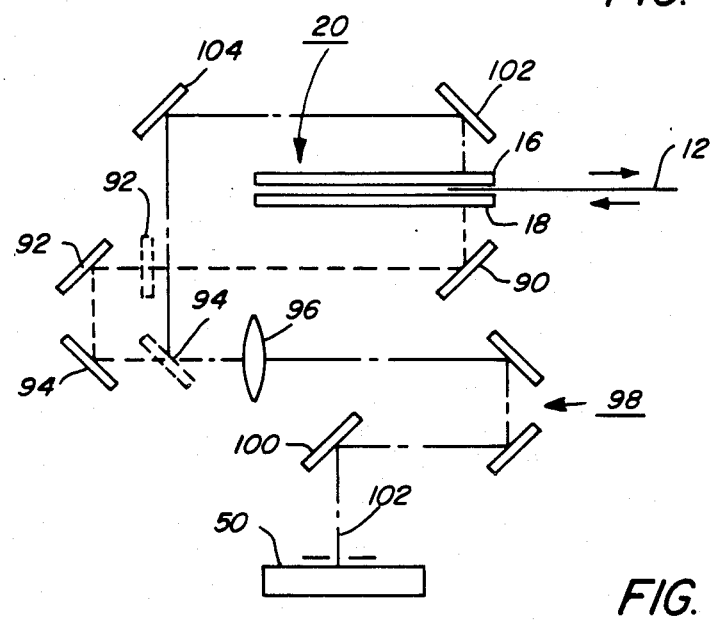
FIG. 4 shows a third embodiment of the scan system of FIG. 1 wherein the bottom of a duplex document is scanned first.

FIG. 4 shows a still further embodiment of the present invention wherein the bottom of the document is scanned first and the top scanned last. As shown, the document 12 is fed between the platen surfaces from the right side. The drive roller, illumination stations and sensors have been omitted for clarity purpose but would function in the same manner described for the FIG. 1 embodiment. With the bottom illumination station engaged, the scanned image is reflected from mirror 90, mirror pair 92, 94 and projected by lens 96 onto array 50 via mirror pair 98 and folding mirror 100. The scan sequence could be reversed, if desired, and the top surface scanned first.

At the end of scan, drive roller rotation is reversed, the top illumination station is engaged, mirror 92 is pivoted upward to a vertical position and the mirror pair is moved to the right to the dotted line position. It is understood that these functions are enabled by the system control circuitry. The scanned document image is now reflected from mirrors 102, 104 and 94 through lens 96 and along the optical path 102 to array 50. Head to head portrait mode with long edge feed is enabled with this configuration.

Figure 5:
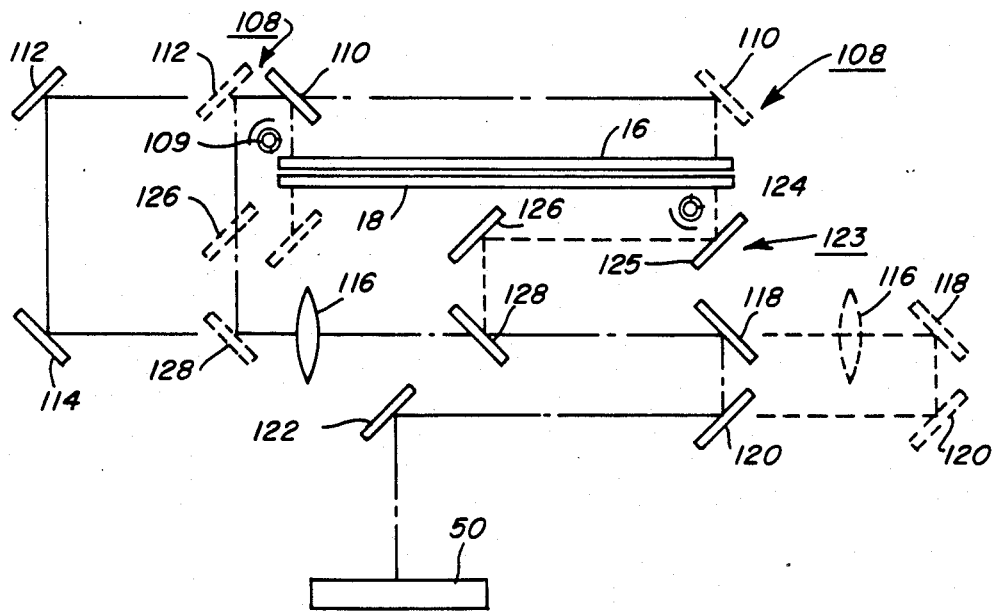
FIG. 5 shows a fourth embodiment of the scan system of FIG. 1 wherein the document is held stationary and the optics is moved.

The FIG. 5 embodiment represents a system for duplex scanning of a stationary document. A document is positioned between plates 16, 18 of platen 20. The scan sequence is initiated by energization of scan illumination assembly 108, comprising apertured illuminator 109 and scan mirror 110. Assembly 108 scans the top of the document from left to right. Mirrors 112, 114 move at $\frac{1}{2}$ the rate of mirror 110 to the dotted line position to maintain correct object to lens conjugate. The document image is reflected from mirror 114 and projected by lens 116 onto array 50 via mirror pair 118, 120 and mirror 122. At the end of scan, and assuming a duplex mode is selected, assembly 108, returns to the start of scan position and illumintor 109 is deenergized. Lens 116 and mirror pair 118, 120 are moved to the right to the dotted line locations. Scan illumination assembly 123 is energized and mirrors 126 and 128, normally out of the optical path are moved into the optical path. Scan illuminator assembly 123 now moves from right to left scanning the bottom of the document. Mirrors 126, 128 move at $\frac{1}{2}$ the rate. The document image is reflected from mirror 124, $\frac{1}{2}$ rate mirrors 126, 128 and projected by lens 116 onto array 50 via mirrors 118, 120, 122.

Figure 6:
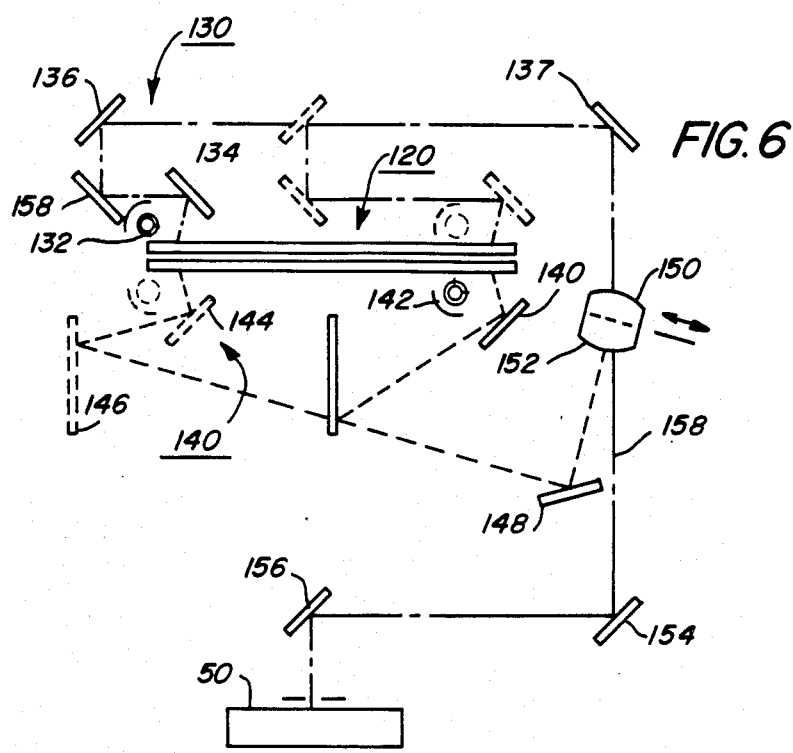
FIG. 6 is a variation of the FIG. 5 embodiment.

Another embodiment where the document remains stationary is shown in FIG. 6. In this embodiment, a duplex document, placed between the transparent plates of platen 120, is first scanned from left to right by scan illumination assembly 130 comprising illuminator 132 and scan mirror 134. Mirror pair 136, 138 moves at $\frac{1}{2}$ the rate of assembly 130. The reflected image from mirror 136 is reflected by folding mirror 137 into the entrance pupil of lens 150. A movable lens mirror 152 is positioned out of the optical path as the image is projected directly to the lens to array 50 via folding mirrors 154,156. In the duplex mode, scan assembly 130 is returned to the start of scan position and illuminator 132 is deenergized. Scan assembly 140 is activated, illuminator 142 is energized and the bottom of the document is scanned from right to left by full rate scan mirror 144. For this scan, the mirror 152 is placed in the dotted position within lens 150. The reflected image now proceeds from $\frac{1}{2}$ rate mirror 146 to mirror 148 into lens 150 and is reflected from mirror 152 back along optical path 158 to array 50.

Figure 7:
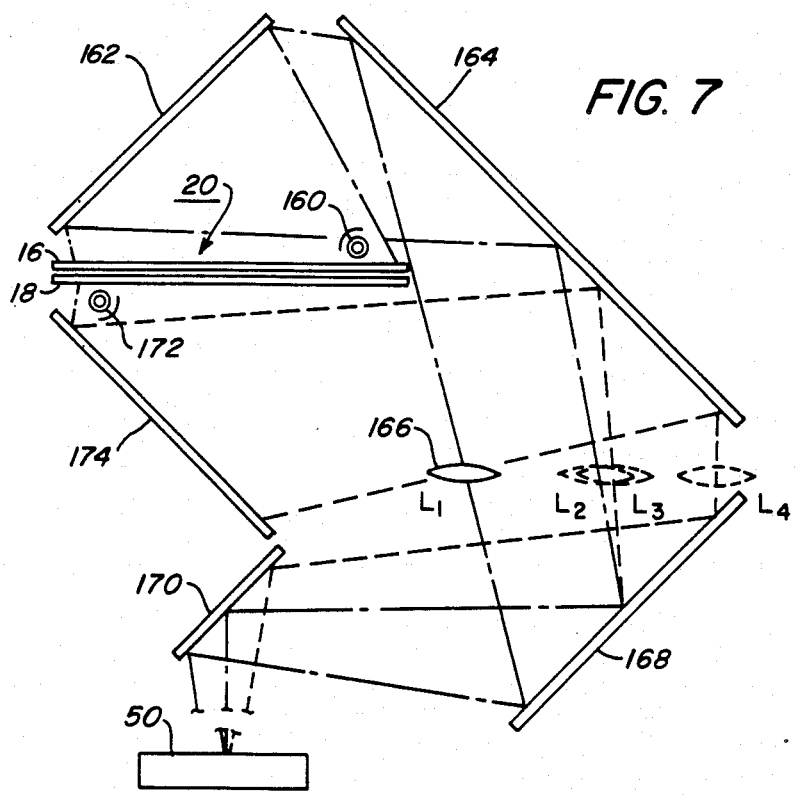
FIG. 7 is a still further embodiment of the present invention wherein both sides of a stationary duplex document are scanned and an image projected by a moving lens.

FIG. 7 shows a further embodiment of the present invention wherein both sides of a stationary duplex document are sequentially scan/illuminated and an image projected by a moving lens. A duplex document is positioned with the platen 16, 18 of platen 20, lens illuminator 160 is energized, and the scan of the top surface proceeds from right to left. The image is reflected along various positions of the surface of mirror 16, reflected from mirror 164 and enter lens 166. The movement of lens 166 from the $L_1$ position to the $L_2$ position is synchronized with the scan motion of illuminator 160. The image is projected by lens 166 onto array 50 via folding mirror 168, 170. At the end of the first scan, illuminator 160 is deenergized and returned to the start of scan positiion. Illuminator 172 is energized and proceeds to scan the bottom surface of the document. The document images are first reflected from mirrors 174, and then from the bottom half of mirror 164 into lens 166 which moves from position $L_3$, corresponding with the start of the second scan to position $L_4$, the end of the second scan. The image projected by the lens is folded by mirrors 168, 170 and focused on array 50.

The FIG. 7 embodiment may be modified by maintaining only two lens positions, one for each scan and by moving the document into and out of the plane of FIG. 7 by a constant velocity transport device. An alternate to the CVT transport system would be to scan the lens into and out of the plane of FIG. 7. The lens would move for the first to second side scan between the midpoint of $L_1$ and $L_2$ to the midpoint of $L_3$ and $L_4$.

FIG. 8 shows another embodiment of the present invention where the document is conveyed to the surface of a transparent platen 200 movable in the indicated direction by signals coupled to a platen drive motor (not shown). The documents are fed by means of a document feed mechanism 202. Mechanism 202 which may be of the type disclosed in U.S. Pat. No. 4,368,977, transports the document from a guide ramp 204 by means of frictional engagement of the document between roller pair 206, 208 and the platen surface. When the entire document is conveyed onto the surface of the platen the reproduction sequence is initiated by selection of appropriate COPY PRINT commands by the operator. Platen 200 is moved from left to right past a pair of fixed scan/illumination stations 210, 211. Station 210 includes an apertured illuminator 212 and folding mirror 214. Station 211 includes an apertured illuminator 216 and folding mirror 218. Depending upon whether MODE I or MODE II operation is selected, illumination station 210 alone, or stations 210, 211 in sequence, are engaged. Image rays from the side of the document being illuminated will be reflected along optical path 220 or 222. Optical system 224, having at least one imaging lens 226 and cooperating folding mirror, 228 focuses a line like scanned image onto the surface of array 50.

When it is desired to operate in the simplex mode (MODE I), the document, or documents, to be scanned are placed in guide ramp 204 and the system controller activates drive rollers 206, 208 for an interval sufficient to advance the simplex document onto the platen and into the copying position. Sensor 230 detects the leading edge of the document sending an output signal to the controller. Power is applied to lamp 212. Station 211 is inoperative in this mode. At this time, platen 200 is moved from left to right carrying the document past the illumination scan strip. The image rays from the document are reflected by mirror 214 along optical path 220 to imaging lens 226 and thence to array 50.

At the end of scan, the trailing edge of the document has moved past sensor 232. This combination causes the lamp 212 to be deenergized and platen 200 to be driven from right to left back to the start of scan position. For a duplex mode, illuminator 216 is energized and the document image is reflected from mirror 218 along optical path 222 through lens 226, which has been moved to the vertical position by the system controller, and onto array 50 via mirror 228.

While the invention has been described with reference to the structures disclosed, it is not confined to the details set forth, but is intended to cover such modifications or changes as may come within the scope of the following claims:

What is claimed is:

1. Apparatus for sequentially scanning both sides of a duplex document and for projecting line images along an optical path onto a light sensitive image member comprising, in combination:

a stationary transparent platen located in an object plane, a first and second scan/illumination station positioned on opposite sides of said platen, means for moving a duplex document across said platen in a first direction to provide a scan excursion adjacent the first side of the document and in a reverse scan direction to provide a scan excursion adjacent the second side of the document, means for energizing said first scan/illumination station at the start of said first scan excursion whereby reflected first side images are propagated along a first optical path, means for energizing said second scan/illumination station at the start of said reverse scan excursion whereby reflected second side images are propagated along a second optical path, a stationary projection lens for projecting and focusing document images on the surface of said light sensitive member, and optical means positioned between the platen and said lens, said optical means adapted to sequentially direct said first and second side images along a common optical path into said lens, whereby said lens projects said images along a common optical path to said light sensitive member.

2. Apparatus according to claim 1 wherein said optical means includes a pivotable miror.

3. Apparatus according to claim 1 wherein said optical means includes a mirror pair adapted to be translated along the optical path, one of said mirrors being further adapted to selectively move out of the optical path.

4. Apparatus according to claim 1 wherein said light sensitive image memger is a linear image array.

5. Apparatus for sequentially scanning both sides of a duplex document and for projecting line images along an optical path onto a light sensitive image member comprising, in combination:

a stationary transparent platen located in an object plane, a first and second scan/illumination station positioned on opposite sides of said platen, means for moving a duplex document across said platen in a first direction to provide a scan excursion adjacent the first side of the document and in a reverse scan direction to provide a scan excursion adjacent the second side of the document, means for energizing said first scan/illumination station at the start of said first scan excursion whereby reflected first side images are propagated along a first optical path, means for energizing said second scan/illumination station at the start of said reverse scan excursion whereby reflected second side images are propagated along a second optical path, a projection lens sequentially movable from said first to said second optical path for projecting and focusing first and second side document images onto the surface of said light sensitive member.

6. Apparatus for sequentially scanning both sides of a duplex document and for projecting line images along an optical path onto a light sensitive image member comprising, in combination:

a stationary transparent platen located in an object plane, a first and second scan/illumination station positioned on opposite sides of said platen, means for moving said first scan/illumination station across said platen in a first direction to provide a scan excursion adjacent the first side of the document, said moving means being further adapted to move said second scan/illumination station in a reverse scan direction to provide a scan excursion adjacent the second side of the document, means for energizing said first scan/illumination station at the start of said first scan excursion whereby reflected first side images are propagated along a first optical path, means for energizing said second scan/illumination station at the start of said reverse scan excursion whereby refected second side images are propagated along a second optical path, a projection lens for projecting and focusing document images on the surface of said light sensitive member, and optical means positioned between the platen and said lens, said optical means adapted to sequentially direct said first and second side images along a common optical path into said lens, whereby said lens projects said images along a common optical path to said member.

7. Apparatus according to claim 6 wherein said optical means includes a sequentially activated first and second full rate/half rate mirror assembly.

8. Apparatus according to claim 7 wherein said lens is movable along the optical path to maintain total conjugate during each scan excursion.

9. Apparatus according to claim 7 wherein said lens is sequentially converted from a straight-through lens to a half-lens.

10. Apparatus according to claim 6 wherein both first and second side images are reflected from at least one common mirror surface into the lens and wherein said lens is adapted to move in a scanning direction during said first and second scan excursion.

* * * * *